(12) United States Patent
Aonuma et al.

(10) Patent No.: US 8,103,128 B2
(45) Date of Patent: *Jan. 24, 2012

(54) GRAPHIC OBJECT COLLISION DETECTION WITH AXIS-ALIGNED BOUNDING REGIONS CALCULATED FROM INCLINATION ANGLE

(75) Inventors: Eiji Aonuma, Kyoto (JP); Yoichi Yamada, Kyoto (JP); Hajime Nakamura, Kyoto (JP); Hiroshi Umemiya, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 275 days.

This patent is subject to a terminal disclaimer.

(21) Appl. No.: 12/591,635

(22) Filed: Nov. 25, 2009

(65) Prior Publication Data

US 2010/0073367 A1 Mar. 25, 2010

Related U.S. Application Data

(63) Continuation of application No. 11/498,772, filed on Aug. 4, 2006, now Pat. No. 7,653,262.

(30) Foreign Application Priority Data

Nov. 18, 2005 (JP) .................................. 2005-333760

(51) Int. Cl.
*G06K 9/36* (2006.01)
(52) U.S. Cl. ......... 382/291; 382/154; 345/474; 345/420
(58) Field of Classification Search .................. 382/291, 382/154; 345/474, 420
See application file for complete search history.

(56) References Cited

U.S. PATENT DOCUMENTS

| | | | |
|---|---|---|---|
| 5,056,031 A * | 10/1991 | Nakano et al. ................ 701/301 |
| 5,157,615 A | 10/1992 | Brodegard et al. |
| 5,506,949 A | 4/1996 | Perrin |
| 6,044,306 A | 3/2000 | Shapiro et al. |
| 6,326,972 B1 | 12/2001 | Buhler et al. |
| 6,400,368 B1 | 6/2002 | Laperriere |

(Continued)

FOREIGN PATENT DOCUMENTS

JP 7-230559 8/1995

OTHER PUBLICATIONS

Angel P. del Pobil, A Practical Approach to Collision Detection Between General Objects, IEEE 1996.*

(Continued)

*Primary Examiner* — Wesley Tucker
*Assistant Examiner* — Mark Roz
(74) *Attorney, Agent, or Firm* — Nixon & Vanderhye P.C.

(57) ABSTRACT

A video game device calculates an angle of an object 71, etc., with respect to a reference direction in a three-dimensional space. Then, the video game device defines a virtual cylindrical model for each of a plurality of objects so that a bottom surface of each cylindrical model is perpendicular to the reference direction. The video game device defines a plurality of cylindrical models for a predetermined object if the inclination of the predetermined object with respect to the reference direction is greater than a predetermined angle. Then, the video game device determines whether or not the defined cylindrical models have an overlap therebetween. Then, if two cylindrical models are determined to be overlapping with each other, the video game device gives a predetermined change to the two objects in response to the collision.

22 Claims, 15 Drawing Sheets

U.S. PATENT DOCUMENTS

| | | | |
|---|---|---|---|
| 6,650,339 | B1 | 11/2003 | Silva et al. |
| 7,104,890 | B2 | 9/2006 | Tsuda et al. |
| 7,233,327 | B2 | 6/2007 | Isner |
| 7,403,202 | B1 | 7/2008 | Nash |
| 2004/0046760 | A1 | 3/2004 | Roberts et al. |
| 2005/0062738 | A1 | 3/2005 | Handley et al. |
| 2006/0258445 | A1 | 11/2006 | Nishimori et al. |
| 2007/0132766 | A1 | 6/2007 | Kim et al. |
| 2007/0171221 | A1 | 7/2007 | Miyamoto et al. |

OTHER PUBLICATIONS

Ralf Kahler et al, Interactive Volume Rendering of Large Sparse Data Sets Using Adaptive Mesh Refinement Hierarchies, IEEE 2003.*

Eric Lengyel, Mathematics for 3D Game Programming, Charles River Media, 2004.

Jean-Paul Laumond, Mark H. Overmars, Algorithms for robotic motion and manipulation: 1996 WAFR.

Jonathan Maim, Real-Time Crowds: Architecture, Variety, and Motion Planning, SIGGRAPH Asia 2008.

Ivana Mikic, Activity Monitoring and Summarization for an Intelligent Meeting Room, IEEE 2000.

Julien Pettre, A 2-Stages Locomotion Planner for Digital Actors, SIGGRAPH 2003.

Steve Shafer, Development of an Integrated Mobile Robot System, Carnegie Mellon University 1989.

Chirag Nepal, Spatial Reasoning for Collision Detection and Hardware Implementation, Springer 2006.

John S. Ketchel, Collision Detection of Cylindrical Rigid Bodies Using Line Geometry, Florida Institute of Technology 2006.

Sunhwa Jung, Adaptive Collision Detection and Resolution for Deformable Objects Using Spherical Implicit Surface, Springer 2005.

John Canny, Collision Detection for Moving Polyhedra, Massachusetts Institute of Technology 1984.

Spyros Vosinakis, A Tool for Construction of 3D Environments with Virtual Agents, Springer 2005.

Tsutomu Hasegawa, Collision Avoidance: Divide and Conquer Approach by Space Characterization and Intermediate Goals, IEEE 1988.

M. Techner, Collision Detection for Deformable Objects, Blackwell 2005.

Kaijen Hsiao, Imitation Learning of Whole-Body Grasps, Massachusetts Institute of Technology, 2005.

Chuan-Jun Su, A New Collision Detection Method for CSG-Represented Objects in Virtual Manufacturing, Elsevier 1999.

Shriram Udupa, Collision Detection and Avoidance in Computer Controlled Manipulators, California Institute of Technology, 1977.

Angel P. del Pobil, A Practial Approach to Collision Detection Between General Objects, IEEE 1996.

Torsten Ullrich, Two different views on Collision Detection, IEEE 2007.

* cited by examiner

Fig. 10

| ANGLE θ | NUMBER OF MODELS | REFERENCE POSITION | LOCATION POSITION |
|---|---|---|---|
| $\theta = 0°$ | 1 | POSITION P1 | BOTTOM SURFACE |
| $0° < \theta \leqq 45°$ | 3 | 1ST : POSITION P2<br>2ND : POSITION P3<br>3RD : POSITION P4 | BOTTOM SURFACE |
| $45° < \theta < 135°$ | 3 | 1ST : POSITION P5<br>2ND : POSITION P6<br>3RD : POSITION P7 | CENTER |
| $135° \leqq \theta < 180°$ | 3 | 1ST : POSITION P8<br>2ND : POSITION P9<br>3RD : POSITION P10 | TOP SURFACE |
| $\theta = 180°$ | 1 | POSITION P11 | TOP SURFACE |

Fig. 14

| ANGLE θ | NUMBER OF MODELS | REFERENCE POSITION | LOCATION POSITION | SIZE |
|---|---|---|---|---|
| θ=0° | 1 | POSITION P1 | BOTTOM SURFACE | $r=r1, h=h1$ |
| 0°<θ≦45° | 3 | 1ST : POSITION P2<br>2ND : POSITION P3<br>3RD : POSITION P4 | BOTTOM SURFACE | 1ST: $r=r2, h=h2$<br>2ND: $r=r3, h=h3$<br>3RD: $r=r4, h=h4$ |
| 45°<θ<135° | 3 | 1ST : POSITION P5<br>2ND : POSITION P6<br>3RD : POSITION P7 | CENTER | 1ST: $r=r5, h=h5$<br>2ND: $r=r6, h=h6$<br>3RD: $r=r7, h=h7$ |
| 135°≦θ<180° | 3 | 1ST : POSITION P8<br>2ND : POSITION P9<br>3RD : POSITION P10 | TOP SURFACE | 1ST: $r=r8, h=h8$<br>2ND: $r=r9, h=h9$<br>3RD: $r=r10, h=h10$ |
| θ=180° | 1 | POSITION P11 | TOP SURFACE | $r=r11, h=h11$ |

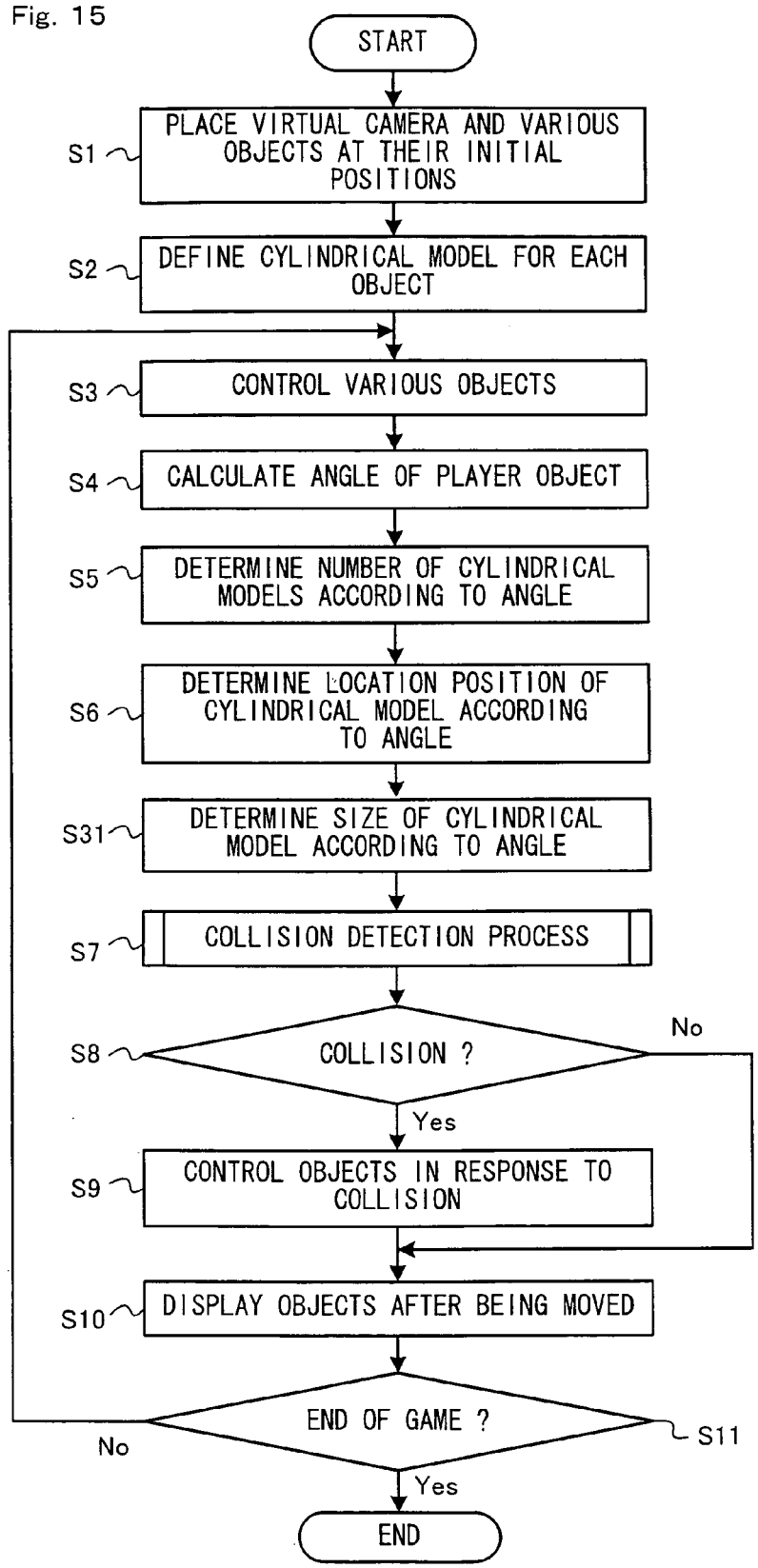

GRAPHIC OBJECT COLLISION DETECTION WITH AXIS-ALIGNED BOUNDING REGIONS CALCULATED FROM INCLINATION ANGLE

CROSS REFERENCE TO RELATED APPLICATION

This application is a continuation of U.S. application Ser. No. 11/498,772 filed Aug. 4, 2006 which claims priority of Japanese Patent Application No. 2005-333760. The disclosures of both of these applications are incorporated herein in their entirety.

BACKGROUND OF THE INVENTION

1. Field of the Invention

The present invention relates to an image processing program and an image processing device and, more particularly, to an image processing program and an image processing device for detecting a collision between objects in a virtual three-dimensional space.

2. Description of the Background Art

Patent Document 1 (Japanese Laid-Open Patent Publication No. 7-230559) describes a conventional technique for performing a collision detection (also called "contact detection") between objects in a video game where there are a plurality of objects (a player character, etc.) in a virtual three-dimensional space. This technique uses a plurality of spherical regions as regions defined for each object for the purpose of collision detection. Specifically, an image processing device described in Patent Document 1 defines a plurality of spherical regions in each object, and calculates the degree of overlap between spherical regions of different objects using the center coordinates and the radii of the spheres. If the degree of overlap is greater than a predetermined value, it is determined that the objects have contacted each other. Thus, a collision detection can be performed by approximating each object by a plurality of spheres. Then, the amount of memory required for the collision detection can be reduced as compared with a case where each object is approximated by a quadrangular prism, whereby it is possible to increase the process speed and the accuracy of the collision detection.

In this conventional technique, the degree of overlap between spheres in a three-dimensional space is calculated, thus requiring an operation using three-dimensional coordinate values, such as an operation of calculating the distance between two points in a three-dimensional space. Therefore, with regard to the processing speed, it can be said that there still is a large processing load on the computer.

SUMMARY OF THE INVENTION

Therefore, an object of the present invention is to provide an image processing program and an image processing device, with which it is possible to further reduce the processing load in a collision detection between objects.

The present invention has the following features to attain the object mentioned above. Note that parenthetic expressions in the following section (reference numerals, supplementary explanations, etc.) are merely to indicate the correlation between what is described in the following section and what is described in the description of the preferred embodiments set out further below in the present specification, and are in no way intended to restrict the scope of the present invention.

A first aspect of the present invention is directed to a computer-readable storage medium storing an image processing program (the video game program) to be executed by a computer (the CPU 31) of an image processing device (the video game device 3) for displaying, on a display device (the television receiving set 2), a virtual three-dimensional space (the game space) where there is at least one object (the player object 71) for which cylindrical collision detection regions (the cylindrical models 72, 72a to 72c) are defined. The image processing program instructs the computer to perform an inclination angle calculation step (S4), a number-of-regions determining step (S5), and a collision detection region defining step (S6). The inclination angle calculation step is a step of calculating an inclination of an object with respect to a predetermined reference direction (the arrow D1) in the three-dimensional space. The number-of-regions determining step is a step of determining the number of cylindrical collision detection regions to be defined for the object according to the inclination of the object. The collision detection region defining step is a step of defining the determined number of collision detection regions for the object in an arrangement being determined according to the inclination of the object so that a bottom surface of each of the collision detection regions is perpendicular to the reference direction.

In a second aspect of the present invention, the inclination calculated in the inclination calculation step may be represented by an angle between the reference direction and a direction of a ground at a position where the object is located.

In a third aspect of the present invention, the inclination calculated in the inclination calculation step may be represented by an angle between a predetermined central axis of the object and the reference direction.

In a fourth aspect of the present invention, in the number-of-regions determining step, the computer may determine the number of regions to be defined for the object to be one if the inclination of the object with respect to the reference direction is less than a predetermined angle.

In a fifth aspect of the present invention, a sum of bottom-surface diameters of the number of cylindrical collision detection regions defined for the object may be greater than or equal to a height of a single cylindrical collision detection region to be defined for the object when the inclination of the object with respect to the reference direction is less than the predetermined angle.

In another aspect of the present invention, in the number-of-regions determining step, the computer may determine the number of regions to be defined for the object to be more than one if the inclination of the object with respect to the reference direction is greater than a predetermined angle. In this aspect, a sum of bottom-surface diameters of a plurality of cylindrical collision detection regions defined for the object when the inclination of the object with respect to the reference direction is greater than the predetermined angle may be greater than or equal to a height of a single cylindrical collision detection region to be defined for the object when the inclination of the object with respect to the reference direction is less than the predetermined angle.

In a sixth aspect of the present invention, if the number of regions is determined to be two or more in the number-of-regions determining step, the computer may arrange, in the collision detection region defining step, the cylindrical collision detection regions defined for the object so that each collision detection region is in contact with at least one of the other collision detection regions and so that the collision detection regions are combined into a single integral region.

In a seventh aspect of the present invention, the collision detection region defining step may include a size changing step (S31). The size changing step is a step of changing a size of the collision detection region defined for the object according to the angle of the object if the inclination of the object with respect to the reference direction is greater than a predetermined angle.

The present invention may be provided in the form of an image processing device capable of realizing similar functions to those realized by executing the image processing program as set forth above.

According to the first aspect, a cylindrical collision detection region is defined for each object for the collision detection. Each cylindrical collision detection region is defined so that the bottom surface thereof is perpendicular to the reference direction. Thus, the image processing device can perform the collision detection process as two partial processes, i.e., the process for the plane perpendicular to the reference direction (the first detection process to be described later), and the process for the reference direction (the second detection process to be described later). Therefore, if the detection result of one detection process is false, the image processing device no longer needs to perform the other detection process, whereby the collision detection process can be made simpler and faster as compared with a conventional method using spherical models.

Where a predetermined object is inclined from the reference direction, the inclination of the object and that of the collision detection region are not equal to each other if only one collision detection region is defined for the object (see FIG. 5). Then, the object is not entirely included within the collision detection region, and it is not possible to accurately perform the collision detection for the object. If the collision detection region is defined so that the inclination thereof is equal to that of the predetermined object, the direction of the collision detection region defined for the predetermined object is no longer equal to that of the collision detection region defined for other objects (see FIG. 6). Then, the collision detection cannot be performed by the first detection process and the second detection process, and the computational cost for the collision detection will increase.

In contrast, according to the first aspect, the number of collision detection regions is determined according to the inclination of the object (see FIG. 7). Thus, a plurality of collision detection regions can be arranged according to the direction of the predetermined object, without changing the direction of an individual collision detection region. Therefore, even where the predetermined object is inclined from the reference direction, the collision detection can be made simpler and faster.

According to the second aspect, the direction of the object can be calculated based on the angle between the reference direction and the direction of the ground at the position where the object is located. Thus, the direction of the object can easily be calculated.

According to the third aspect, the direction of the object can be calculated based on the angle between the reference direction and the predetermined central axis of the object. Thus, the direction of the object can easily be calculated.

According to the fourth aspect, where it is determined that the object is not inclined from the reference direction, a single collision detection region is defined for the object. Thus, as compared with a case where a plurality of collision detection regions are defined, the collision detection process can be made simpler. Where the object is not inclined from the reference direction, the shape of the object can be approximated by a single collision detection region. Therefore, as in the above aspect, it is possible to accurately perform the collision detection.

According to the fifth aspect, the sum of the widths of cylindrical models in a case where the object is inclined from the reference direction is greater than or equal to the height of the cylindrical model in a case where the object is not inclined from the reference direction. Thus, collision detection regions can be defined with no gaps therebetween. If the collision detection regions are arranged with gaps therebetween, the collision detection for the predetermined object may not be performed accurately. In this aspect, it is possible to accurately perform the collision detection.

According to the sixth aspect, collision detection regions defined for a single object are arranged with no gaps therebetween so that the collision detection regions are in contact with one another, whereby it is possible to accurately perform the collision detection.

According to the seventh aspect, the size of the collision detection region varies depending on the angle of the object with respect to the reference direction. Therefore, the size of the collision detection region can be determined more precisely according to the inclination of the player object, and it is possible to more accurately perform the collision detection.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows an example of a model determining table;

FIG. 14 shows an example of a model determining table used in a variation of an embodiment of the present invention; and FIG. 15 is a flow chart showing the flow of the game process according to the variation.

DESCRIPTION OF THE PREFERRED EMBODIMENTS

Figure 1:
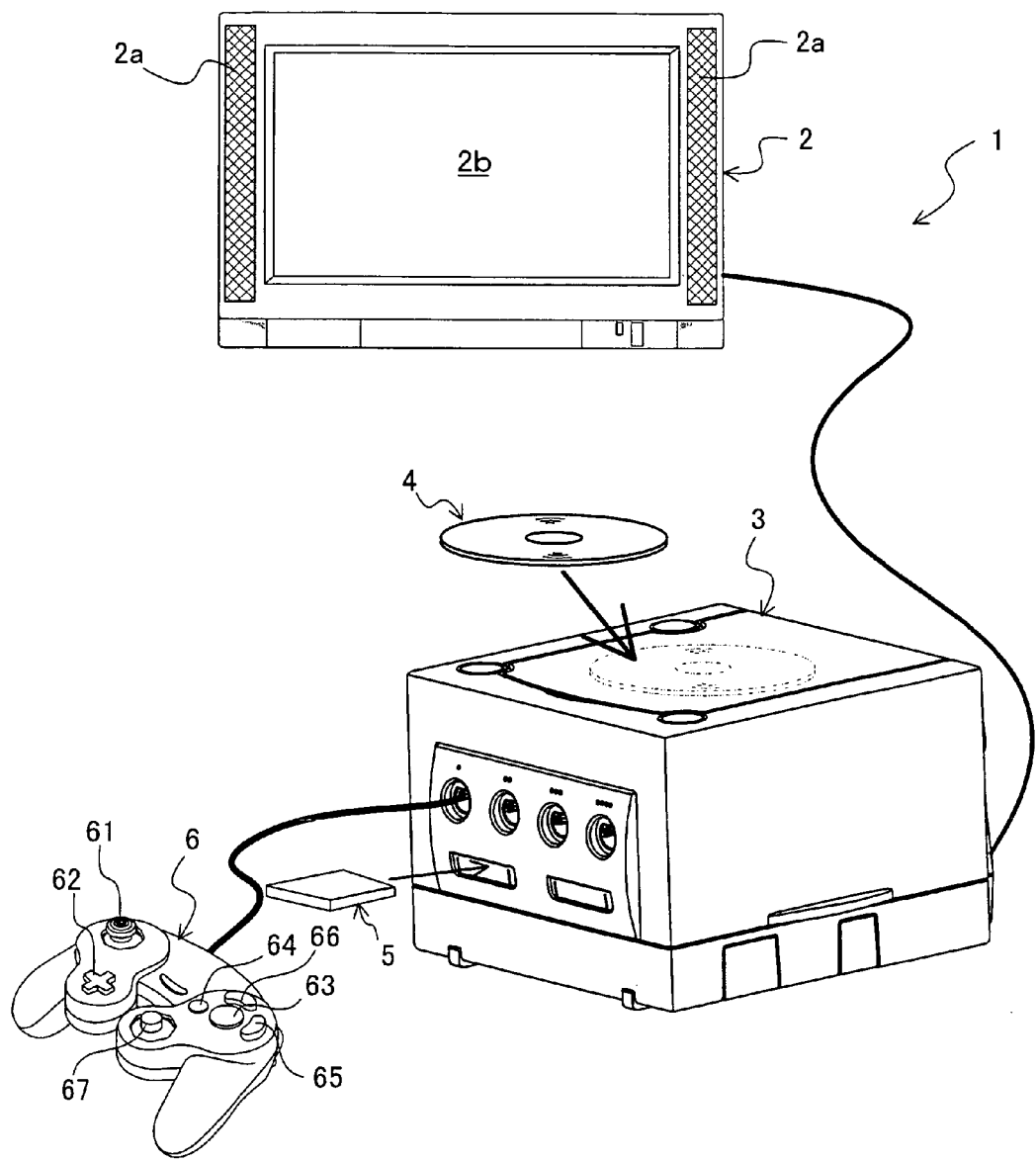
FIG. 1 shows an external view of a video game system including a video game device according to an embodiment of the present invention.

A video game device, a video game program and a game system including the video game device according to an embodiment of the present invention will now be described. FIG. 1 shows an external view of a game system 1. While a home-console type video game device will be described below as an example of an image processing device according to the present embodiment, the image processing device of the present invention is not limited thereto. For example, the present invention can be used with any type of device that includes a computer therein for executing a video game program (the image processing program), such as a portable video game device, an arcade video game device, a PDA, a mobile phone or a personal computer.

Referring to FIG. 1, the video game system 1 includes a home-console type video game device (hereinafter referred to simply as a "video game device") 3, a television receiving set (hereinafter referred to simply as a "TV") 2 being an example of a display device to be connected to the video game device 3 via a connection cable. A controller 6 including a plurality of control switches that can be operated by the player is connected to the video game device 3. The video game device 3 can receive an optical disc 4 being an example of an information storage medium storing a video game program of the present embodiment. The video game device 3 can also receive a cartridge 5 including a flash memory, or the like, for storing save data of a game, or the like. The video game device 3 displays, on the TV 2, a game image obtained by executing a video game program stored in the optical disc 4. Using the save data stored in the cartridge 5, the video game device 3 can allow the player to resume a game that was played and saved in the past, or can reproduce a past game status to obtain a game image for that past game status, and display the obtained game image on the TV 2. Then, the player of the video game device 3 can enjoy the game by operating the controller 6 while watching the game image displayed on the TV 2.

As described above, the controller 6 is detachably connected to the video game device 3 via a connection cable. The controller 6 is means for controlling primarily a player object (an object (character) to be controlled by the player) in the game space displayed on the TV 2, and includes an input section including control buttons, keys, sticks, etc., as the plurality of control switches. Specifically, the controller 6 includes a grip section to be held by the player. The controller 6 includes a main stick 61 and a cross-shaped key 62 that can be operated by the player's left thumb, for example, and a C stick 67, an A button 63, etc., that can be operated by the player's right thumb, for example. The controller 6 also includes a B button 64, an X button 65, a Y button 66 and a start-pause button. The controller 6 further includes an R button and a Z button that can be operated by the player's right index finger, for example, and an L button that can be operated by the player's left index finger. In the video game system 1, a game can be played by a plurality of players at the same time by connecting a plurality of controllers 6 to the video game device 3.

Figure 2:
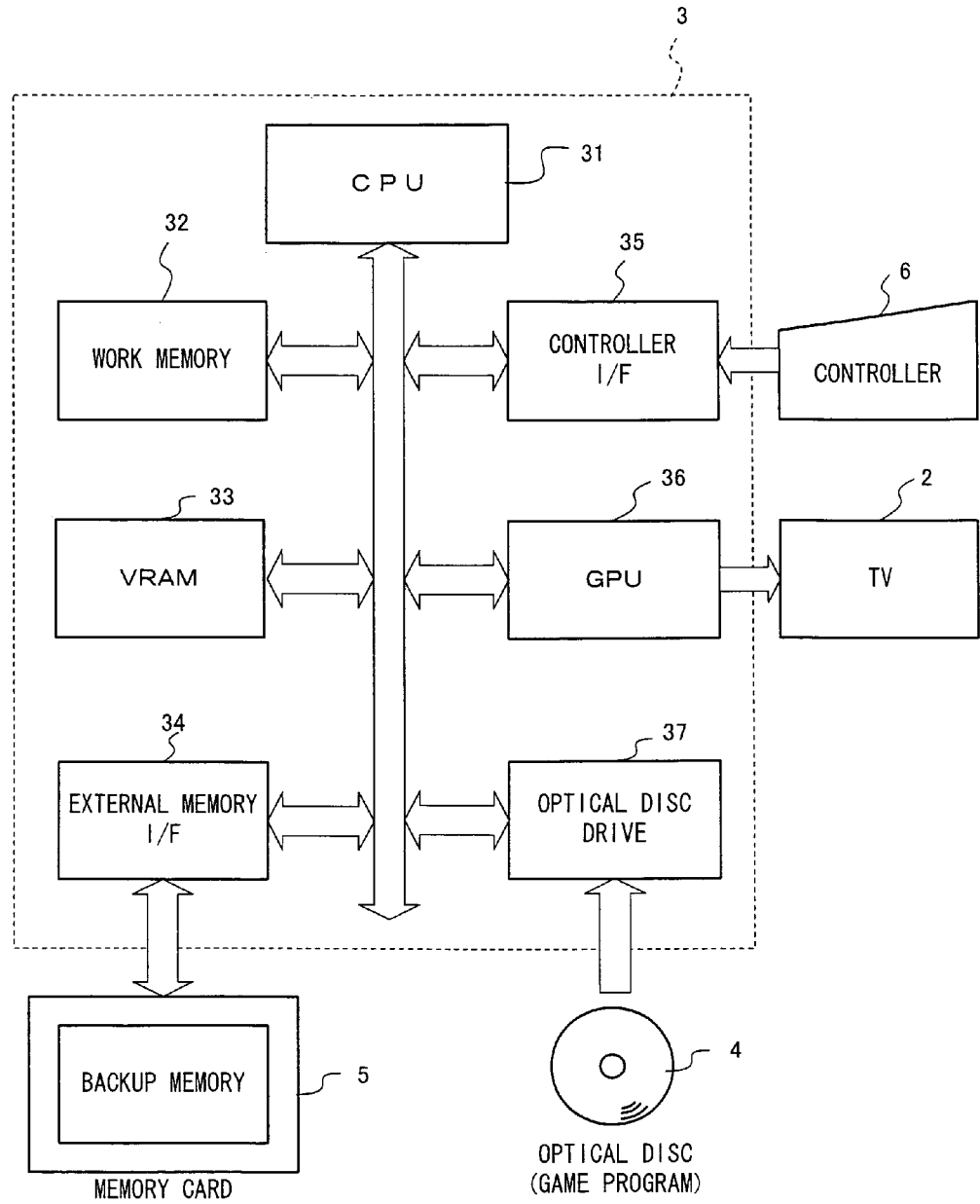
FIG. 2 shows a functional block diagram of the video game system shown in FIG. 1.

Referring now to FIG. 2, a configuration of the video game device 3 of the present invention will be described. FIG. 2 shows a functional block diagram of the video game system 1. Referring to FIG. 2, the video game device 3 includes a CPU (Central Processing Unit) 31 for executing various programs. The CPU 31 executes a boot program stored in a boot ROM (not shown), thus initializing memory devices, such as a work memory 32. Then, the CPU 31 loads a video game program from the optical disc 4 to the work memory 32, and executes the video game program to perform a game process according to the video game program. The work memory 32, a video RAM (VRAM) 33, an external memory interface (I/F) 34, a controller interface (I/F) 35, a GPU (Graphics Processing Unit) 36 and an optical disc drive 37 are connected to the CPU 31 via a bus.

The work memory 32 is a storage area used by the CPU 31, and stores, as necessary, a video game program, etc., needed for the process performed by the CPU 31. For example, the work memory 32 stores a video game program, various data, etc., read out from the optical disc 4 by the CPU 31. The video game program, the various data, etc., stored in the work memory 32 are executed or otherwise used by the CPU 31. The VRAM 33 stores game image data used for displaying a game image on the TV 2. The external memory I/F 34 includes a connector (not shown) into which the cartridge 5 is plugged for communicable connection between the video game device 3 and the cartridge 5. The CPU 31 accesses a backup memory provided in the cartridge 5 via the external memory I/F 34. The controller I/F 35 includes a connector (not shown) via which an external unit and the video game device 3 are communicably connected together. For example, the controller 6 is connected to the connector via a connection cable so as to be connected to the video game device 3 via the controller I/F 35. In response to the player moving the main stick 61 or the C stick 67 or pressing the control buttons 62 to 66, etc., the controller 6 outputs control data, representing the player's operation on the controller 6, to the video game device 3. The GPU 36 includes a semiconductor chip for performing a vector calculation operation, a rendering operation, etc., needed for displaying 3D graphics, in response to an instruction from the CPU 31. The game image rendered by the GPU 36 is displayed on the TV 2. In response to an instruction from the CPU 31, the optical disc drive 37 reads out various data, such as a video game program, image data and sound data stored in the optical disc 4.

The game process to be performed by the video game device 3 according to the video game program stored in the optical disc 4 will now be described. First, the game of the present embodiment will be outlined. The present game is an action game where there are a plurality of objects in a three-dimensional virtual game space. In this game, there are a player object controlled by the player, enemy objects controlled by the video game device 3, etc. The player object and enemy characters attack each other using weapons such as swords, bow and arrows, etc. As the player object is attacked by an enemy object, the physical strength of the player object is decreased, and the game is over when the player object has no remaining physical strength. The object of this game for the player is to control the player object to defeat enemy objects.

In this game, the video game device 3 determines whether or not objects have contacted each other (collision detection) during the game process. This is for determining, for example, whether or not the sword of the enemy object has hit the player object, or whether or not the sword of the player object has hit the enemy object. In the present embodiment, the video game device 3 virtually defines a cylindrical model for each object for the purpose of collision detection.

Figure 3:
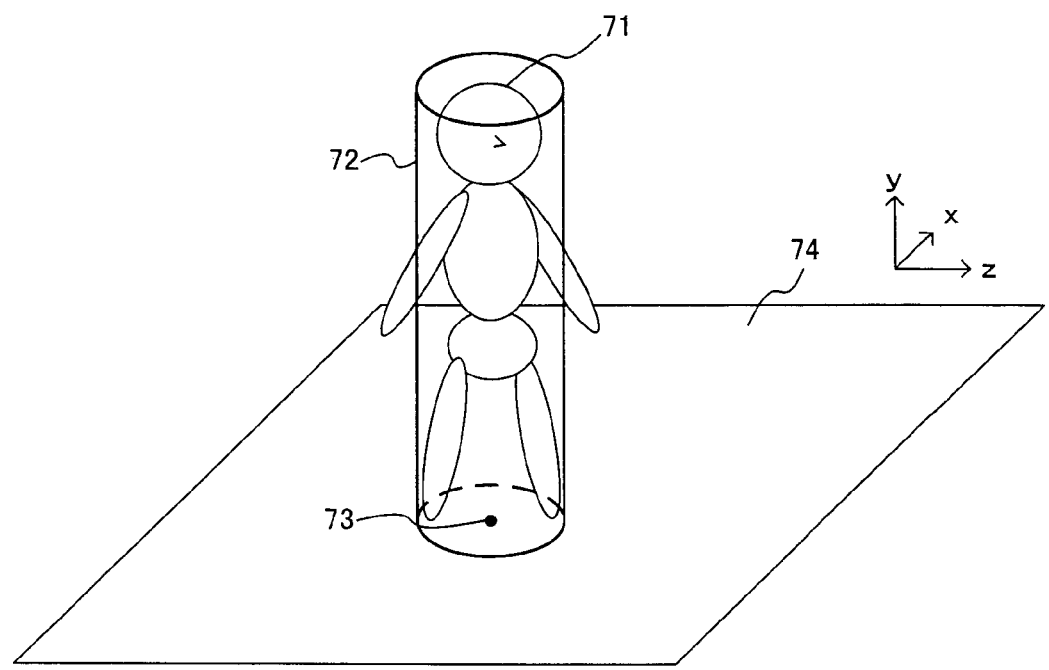
FIG. 3 shows a player object and a cylindrical model defined therefor.

FIG. 3 shows a player object and a cylindrical model defined therefor. FIG. 3 shows a player object 71 standing upright on a ground 74 in the virtual game space. The coordinate system (the world coordinate system) for specifying a position in the game space is defined so that the x axis and the z axis are parallel to the ground 74 while the y axis is vertical to the ground 74. With the player object 71 standing upright, one cylindrical model 72 is defined for the player object 71. The cylindrical model of the type in which only one model is defined for the player object 71 accounting for the entire player object 71 (e.g., the cylindrical model 72) is hereinafter referred to also as a "whole model".

The cylindrical model 72 is defined so that the bottom surface thereof is perpendicular to a reference direction. The reference direction is a predetermined direction. In the present embodiment, the predetermined direction is the positive y-axis direction in the coordinate system (a world coordinate system) of the game space. As a result, the cylindrical model 72 is defined with the central axis thereof being vertical to the ground 74. Although not shown in FIG. 3, the cylindrical model is defined for each object other than the player object 71. As is the cylindrical model 72, the cylindrical model defined for any other object has its bottom surface perpendicular to the reference direction.

Referring to FIG. 3, a point 73 is the reference for the position of the cylindrical model 72 with respect to the player object 71. This point is hereinafter referred to as the "reference point". Based on the position of the reference point defined for an object, the video game device 3 determines the position of the cylindrical model for the object. In the example of FIG. 3, where the player object 71 is standing upright, the reference point 73 is defined at the feet of the player object 71 (e.g., at the intersection between the central axis of the player object 71 and the ground). The cylindrical model 72 is located so that the central position of the bottom surface thereof is at the reference point 73. As a result, the cylindrical model 72 is defined along the longitudinal direction of the player object 71 as shown in FIG. 3. In the present embodiment, the cylindrical model is defined virtually for the corresponding object. In other words, a cylindrical model is not a set of polygons arranged in the game space. The cylindrical model is not displayed on the TV 2.

Figure 4:
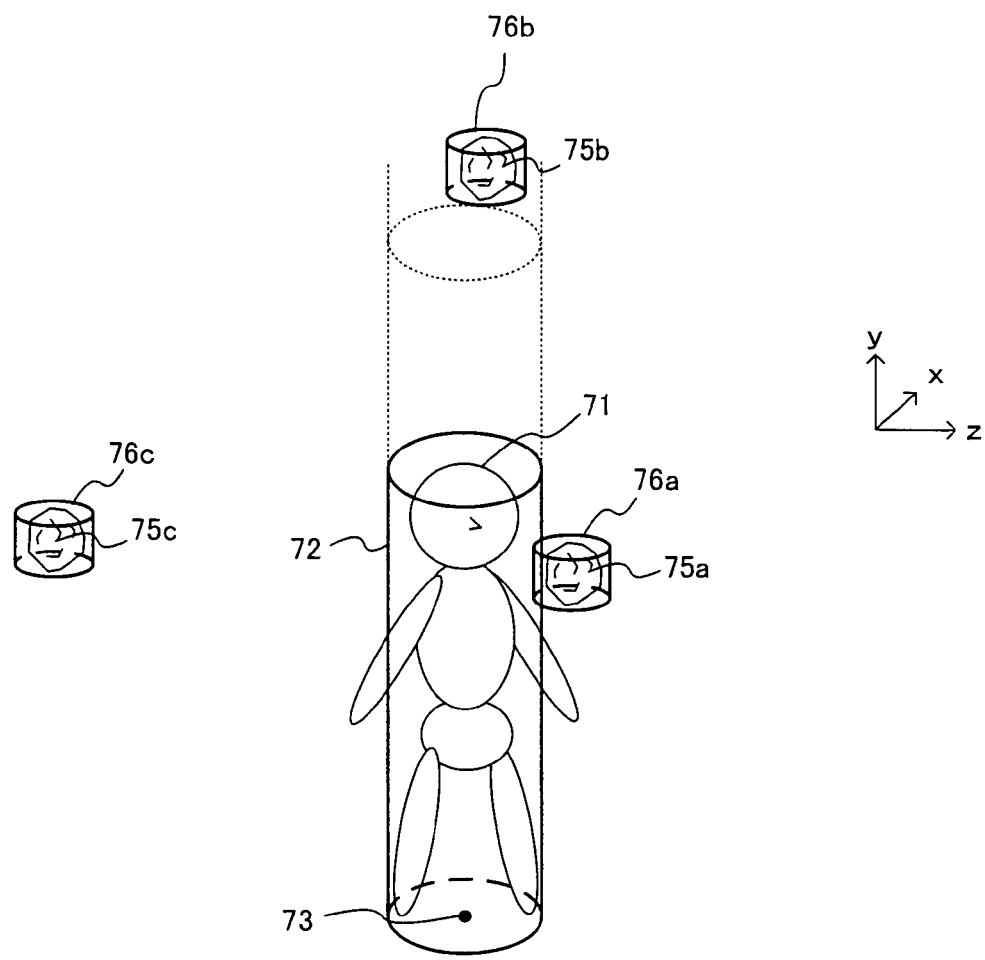
FIG. 4 shows how a collision detection process is performed in an embodiment of the present invention.

In the present embodiment, the video game device 3 detects a collision between objects using cylindrical models defined for the objects. FIG. 4 shows how a collision detection process is performed in the present embodiment. Referring now to FIG. 4, a collision detection process between the player object 71 and three stone objects 75a to 75c will be described. As described above, a cylindrical model is defined for each of the three stone objects 75a to 75c, as for the player object 71. Specifically, cylindrical models 76a to 76c are defined for the stone objects 75a to 75c, respectively. As is the cylindrical model 72, the cylindrical models 76a to 76c of the stone objects 75a to 75c are defined so that the bottom surface thereof is perpendicular to the reference direction. The video game device 3 defines the reference point at the central position of each of the stone objects 75a to 75c, and locates each of the cylindrical models 76a to 76c so that the central position thereof is at the reference point.

In FIG. 4, the cylindrical model 72 and the cylindrical model 76a have an overlap therebetween on the xz plane. As used herein, "two cylindrical models having an overlap therebetween on the xz plane" means that two (circular) images obtained by projecting the two cylindrical models onto the xz plane are in contact with each other or intersecting each other. The cylindrical model 72 and the cylindrical model 76a have an overlap between also in the Y-axis direction. As used herein, "two cylindrical models having an overlap therebetween in the Y-axis direction" means that their positions have an overlap therebetween in the y axis. If two cylindrical models have an overlap therebetween on the xz plane and also have an overlap therebetween in the Y-axis direction, the video game device 3 determines that the two objects corresponding to the two cylindrical models are in contact with each other. In the example of FIG. 4, it is determined that the player object 71 and the stone object 75a are in contact with each other.

In FIG. 4, the cylindrical model 72 and the cylindrical model 76b have an overlap therebetween on the xz plane, but not in the Y-axis direction. Therefore, the video game device 3 determines that the player object 71 and the stone object 75b are not in contact with each other. The cylindrical model 72 and the cylindrical model 76c do not have an overlap therebetween on the xz plane. Therefore, the video game device 3 determines that the player object 71 and the stone object 75c are not in contact with each other.

The video game device 3 independently performs a process (first detection process) of determining whether or not two cylindrical models have an overlap therebetween on the xz plane and another process (second detection process) of determining whether or not the two cylindrical models have an overlap therebetween in the Y-axis direction. As will later be described in detail, the first detection process can be performed by calculating the distance between the centers of the two cylindrical models on the xz plane (step S23 to be described later). Thus, the first detection process is performed based on a two-dimensional calculation using the x and z coordinates of each cylindrical model. The second detection process can be performed by calculating the positions of the two cylindrical models in the Y-axis direction (step S25 to be described later). Thus, the second detection process is performed based on a one-dimensional calculation using the y coordinates of the cylindrical models. Thus, in the present embodiment, the video game device 3 can perform the collision detection based on a one-dimensional calculation and a two-dimensional calculation. In contrast, the conventional method using spherical models for collision detection requires the video game device to perform a three-dimensional calculation. Thus, according to the present embodiment, the calculation to be performed for collision detection is simpler than in the conventional method, whereby it is possible to reduce the processing load on the video game device 3.

In the present embodiment, where a collision detection is performed for two cylindrical models, the video game device 3 first performs the first detection process. Only when the detection result of the first detection process is true (when it is determined that the two cylindrical models have an overlap therebetween on the xz plane), the video game device 3 performs the second detection process. Thus, when the detection result of the first detection process is false, the video game device does not perform the second detection process, thereby simplifying the collision detection process. In other embodiments, the video game device 3 may first perform the second detection process, and then the first detection process only when the detection result of the second detection process is true.

In the present embodiment, the cylindrical models of different objects are all in the same orientation, as described above. Therefore, the collision detection can easily be done by the first detection process and the second detection process. In other words, the cylindrical models need to be in the same orientation in order to make the collision detection easier to perform. Now, assume a case where an object is inclined, e.g., where the player object 71 is inclined with respect to the ground 74.

Figure 5:
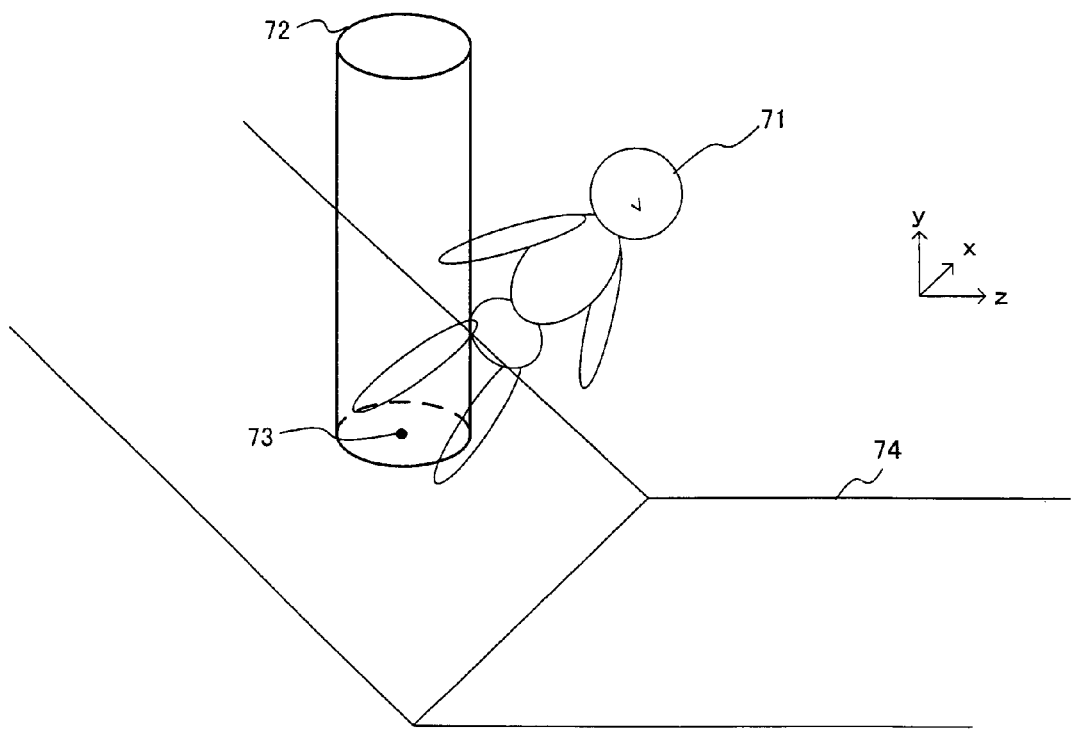
FIG. 5 shows an example where a cylindrical model is defined for a player object being inclined with respect to the ground.

Assume a case where the player object 71 is inclined with respect to the ground 74 and where the cylindrical model 72 is defined with the central axis thereof being vertical to the ground 74 as in the case where the player object 71 is standing upright on the ground 74. FIG. 5 shows an example where the cylindrical model 72 is defined for the player object 71 being inclined with respect to the ground. As shown in FIG. 5, if the cylindrical model 72 is defined so that the central axis thereof is vertical to the ground 74, the inclination of the player object 71 is not equal to that of the cylindrical model 72. Then, it is not possible to accurately perform the collision detection for the player object 71.

Figure 6:
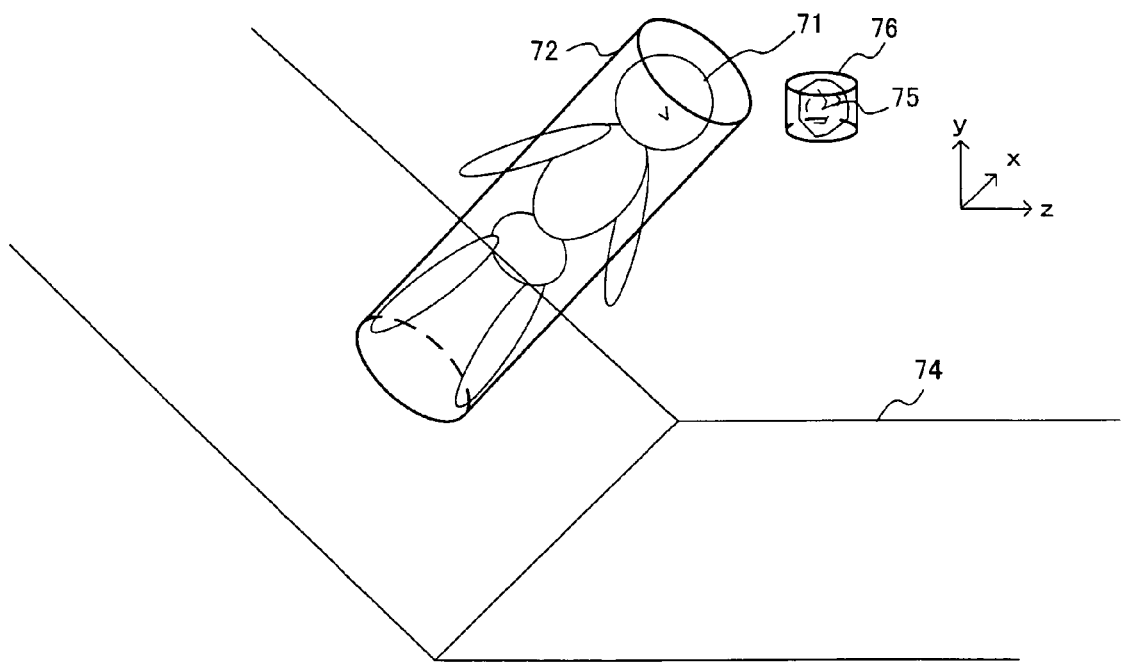
FIG. 6 shows another example where a cylindrical model is defined for a player object being inclined with respect to the ground.

Assume another case where the player object 71 is inclined with respect to the ground 74 and where the inclination of the cylindrical model 72 is equal to that of the player object 71. FIG. 6 shows another example where the cylindrical model 72 is defined for the player object 71 being inclined with respect to the ground. As shown in FIG. 6, where the inclination of the cylindrical model 72 is equal to that of the player object 71, the orientation of the cylindrical model 72 defined for the player object 71 may not be equal to that of the cylindrical model 76 defined for another object (the stone object 75). Then, the collision detection cannot be performed by the first detection process and the second detection process, and the computational cost for the collision detection will increase.

As described above with reference to FIGS. 5 and 6, where the player object 71 is inclined with respect to the ground 74, a problem arises no matter in which orientation the single whole model (the cylindrical model 72) is defined. In view of this, according to the present embodiment, the video game device 3 may divide the cylindrical model defined for the player object 71 into smaller models, i.e., define a plurality of cylindrical models therefor. The plurality of cylindrical models defined for the player object 71 are hereinafter referred to also as "partial models". Each partial model is a cylindrical model defined for a portion of the player object 71.

Figure 7:
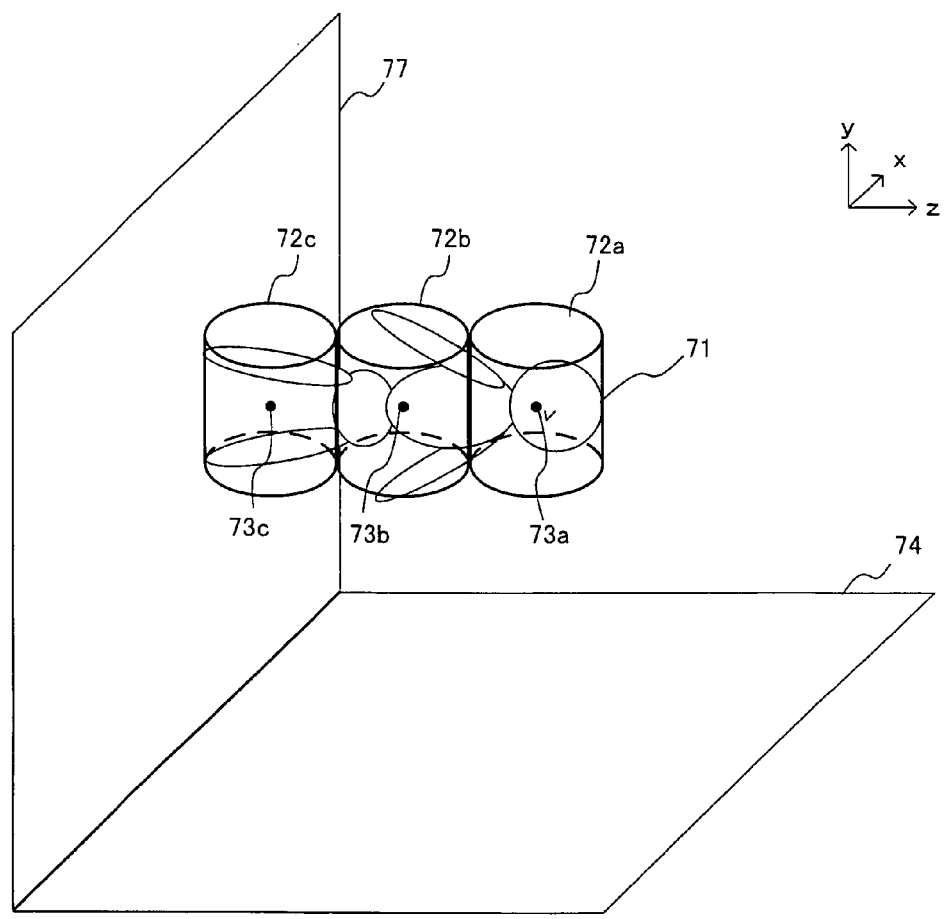
FIG. 7 shows a player object standing in the horizontal direction on a wall vertical to the ground.

FIG. 7 shows the player object 71 standing in the horizontal direction on a wall 77 vertical to the ground 74. Assume herein that the player object 71 can stand in the horizontal direction on the wall 77 when the player object 71 is wearing magic boots, which allow the wearer to walk on the wall 77, or when the direction of gravity changes in the game, for example.

As shown in FIG. 7, where the player object 71 is inclined with respect to the ground 74, three cylindrical models 72a to 72c are defined as partial models for the player object 71. The cylindrical models 72a to 72c are hereinafter referred to also as first, second and third partial models, respectively. While three cylindrical models are defined for the player object 71 in the present embodiment, the number of partial models defined for an object may be any suitable number greater than or equal to two. While the cylindrical models 72a to 72c are of the same size in the present embodiment, they may be of different sizes. The cylindrical models 72a to 72c are each defined so that the bottom surface thereof is perpendicular to the reference direction, as is the cylindrical model 72 shown in FIG. 3. The cylindrical models 72a to 72c are arranged along the player object 71. Specifically, since the player object 71 is in the horizontal direction with respect to the ground 74, the cylindrical models 72a to 72c are arranged in a line in the horizontal direction with respect to the ground 74 (i.e., parallel to the ground 74). Thus, the cylindrical models 72a to 72c can be defined so that each of the cylindrical models 72a to 72c includes therein at least a portion of the player object 71. Therefore, it is possible to accurately perform the collision detection for the player object 71 by using the cylindrical models 72a to 72c.

Where the player object 71 is inclined with respect to the ground 74, the positions of the cylindrical models 72a to 72c are determined based on reference points 73a to 73c, respectively, as in the case where the player object 71 is standing upright. Specifically, the position of the cylindrical model (first partial model) 72a is determined based on the reference point 73a, the position of the cylindrical model (second partial model) 72b is determined based on the reference point 73b, and the position of the cylindrical model (third partial model) 72c is determined based on the reference point 73c. Where the player object 71 is inclined with respect to the ground 74, the cylindrical models 72a to 72c are each located so that the central position of the cylinder is at the corresponding one of the reference points 73a to 73c. The positions of the reference points 73a to 73c with respect to the player object 71 are determined so that each of the cylindrical models 72a to 72c includes therein at least a portion of the player object 71 so as to accurately perform the collision detection for the player object 71 by using the cylindrical models 72a to 72c.

Figure 8:
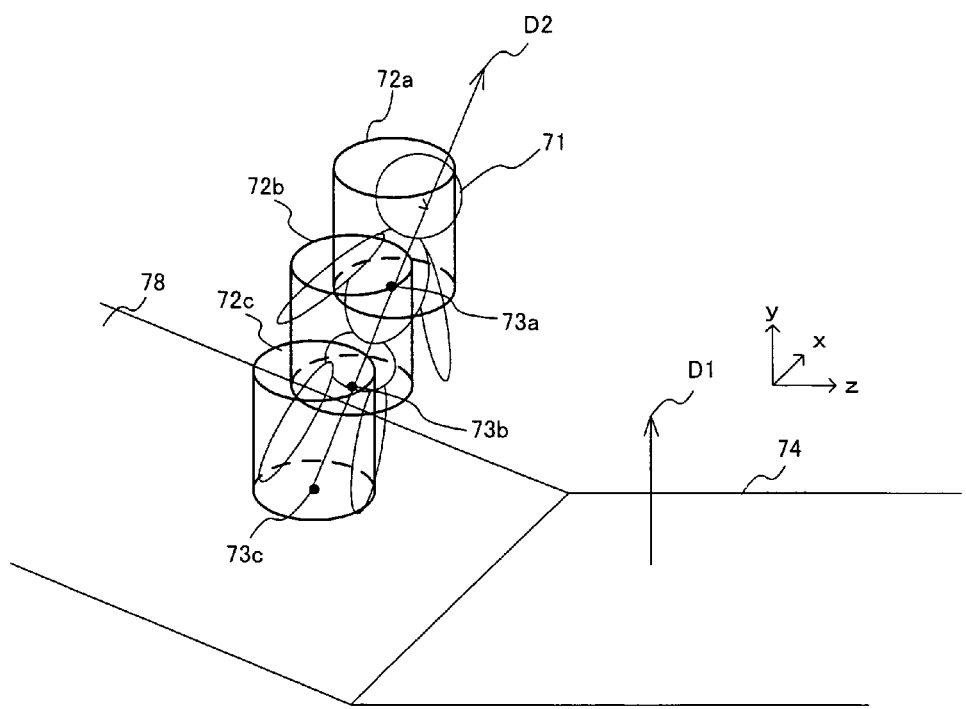
FIG. 8 shows a player object standing vertical to a slope.

FIG. 8 shows the player object 71 standing vertical to a slope 78. In FIG. 8, an arrow D1 denotes the reference direction, and an arrow D2 denotes the direction of the player object 71. In the present embodiment, the direction of the player object 71 is the longitudinal direction thereof, and is a direction from the bottom (the feet) toward the top (the head) of the player object 71. In the present embodiment, the number of cylindrical models to be defined for the player object 71 is determined based on the angle between the reference direction and the longitudinal direction of the player object 71. The details of the method for determining the number of cylindrical models will be described later (see FIG. 10 and step S5 in FIG. 11). In FIG. 8, as in the case where the player object 71 is standing on the wall 77, a plurality of cylindrical models 72a to 72c are defined for the player object 71.

The reference point position defined for the player object 71 and the position at which the cylindrical model is located with respect to the reference point are determined based on the angle between the reference direction and the direction of the player object 71. The details of the method for determining the reference point position and the position at which the cylindrical model is located will be described later (see FIG. 10 and step S6 in FIG. 11). In FIG. 8, the cylindrical models 72a to 72c are each located so that the central position of the bottom surface thereof is at the reference point. The positions of the reference points 73a to 73c are determined so that each of the cylindrical models 72a to 72c includes therein at least a portion of the player object 71 so as to accurately perform the collision detection.

In FIG. 8, the cylindrical models 72a to 72c defined for the player object 71 overlap with one another. In the collision detection process of the present embodiment, the video game device 3 does not perform the collision detection between cylindrical models that are defined for the same single object. This is because there is no need for the collision detection.

As described above, according to the present embodiment, the video game device 3 performs the collision detection between objects using cylindrical models. Thus, as compared with a case where spherical models are used, it is possible to more easily perform the collision detection process. In the present embodiment, an object whose outer shape is elongated (either in the vertical or horizontal direction) (e.g., the player object 71) is assigned either a single whole model or a plurality of partial models depending on the orientation of the object. Thus, it is possible to accurately perform the collision detection for an object having an elongated outer shape while the cylindrical models defined for different objects are all in the same orientation.

Figure 9:
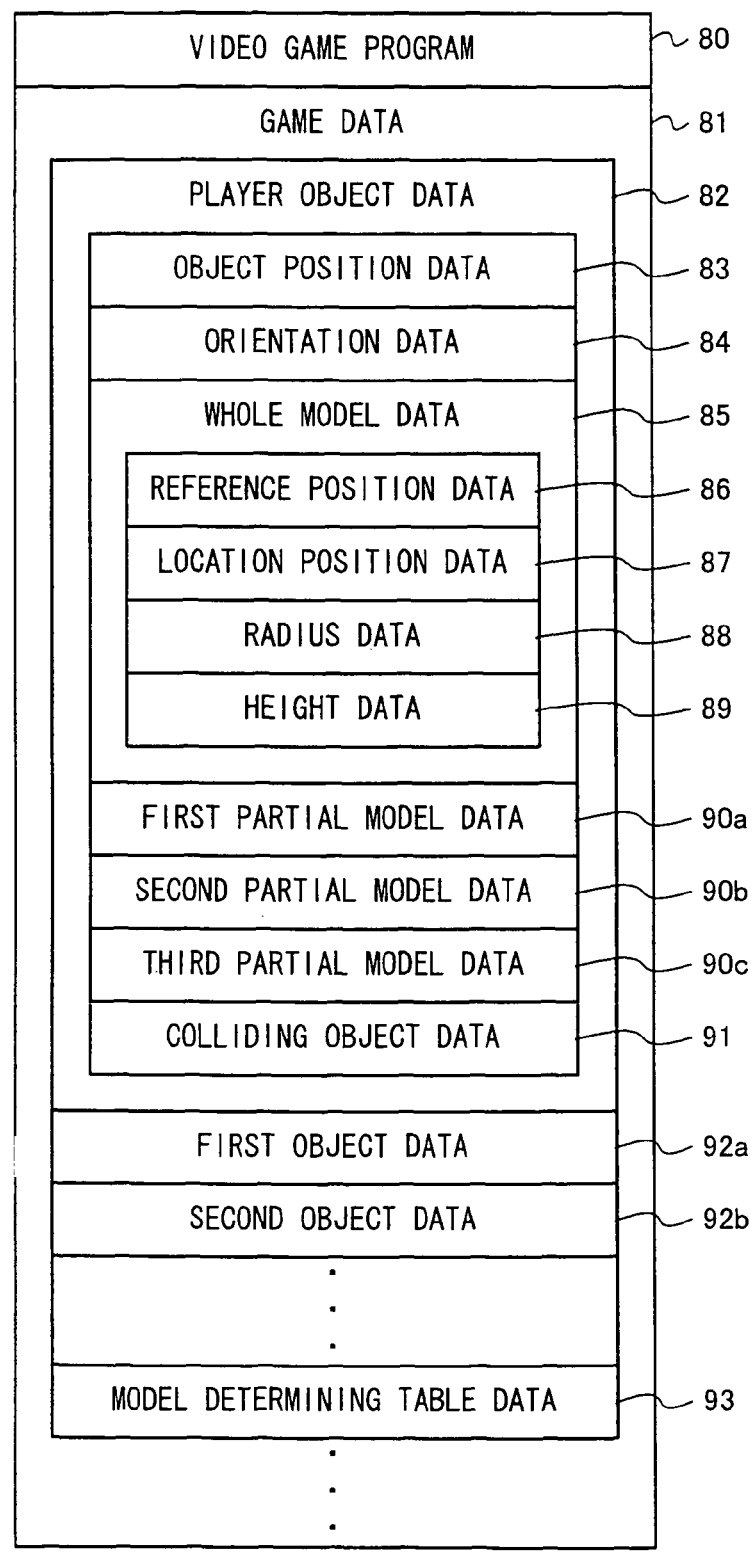
FIG. 9 shows important data stored in a work memory of a video game device.

Referring now to FIG. 9, important data used in the game process will be described. FIG. 9 shows important data to be stored in the work memory 32 of the video game device 3. As shown in FIG. 9, the work memory 32 stores a video game program 80 and game data 81. The video game program 80 is a video game program for instructing the video game device 3 to perform the game process (see FIG. 11) to be described later.

The game data 81 includes player object data 82, first and second object data 92a and 92b, model determining table data 93, etc. Although FIG. 9 shows data of only two objects (i.e., the first object data 92a and the second object data 92b), the work memory 32 stores data of all objects to be present in the game space. In addition to those shown in FIG. 9, the work memory 32 also stores other data necessary for the game process, such as image data of different characters (e.g., the player character and the enemy characters), and game space data (e.g., the terrain data).

The player object data 82 is data regarding the player object 71. Specifically, the player object data 82 includes object position data 83, orientation data 84, whole model data 85, first to third partial model data 90a to 90c, and colliding object data 91. The object position data 83 represents the position of the player object 71 in the game space. The position of the player object 71 is represented by using the world coordinate system. Specifically, the position of the player object 71 is represented as that on the ground at the feet of the player object 71. The orientation data 84 represents the direction (orientation) of the player object 71. In the present embodiment, vector data representing the direction along the longitudinal axis (central axis) of the player object 71 is stored in the work memory 32 as the orientation data 84. Specifically, the direction along the longitudinal axis of the player object 71 is a direction from the feet toward the head of the player object 71.

The whole model data 85 is data regarding a whole model (the cylindrical model 72) defined for the player object 71. Specifically, the whole model data 85 includes reference position data 86, location position data 87, radius data 88, and height data 89.

The reference position data 86 represents the reference point position for the whole model. The reference point position is represented as the position of the player object 71 by using the coordinate system where a predetermined point of the player object 71 is the origin.

The location position data 87 represents the position at which the whole model is located with respect to the reference point. Specifically, the location position data 87 may indicate "center", "bottom surface" or "top surface". If the location position data 87 indicates "center", a cylindrical model being a whole model is located so that the center thereof is at the reference point position. If the location position data 87 indicates "bottom surface", a cylindrical model being a whole model is located so that the center of the bottom surface thereof is at the reference point position. If the location position data 87 indicates "top surface", a cylindrical model being a whole model is located so that the center of the top surface thereof is at the reference point position.

The radius data 88 represents the radius of the bottom surface of a cylindrical model being a whole model. The height data 89 represents the height of a cylindrical model being a whole model. The radius data 88 and the height data 89 included in the whole model data 85 are of predetermined values specified in the video game program 80. Thus, the height of a whole model defined for each object is predetermined.

The first partial model data 90a is data regarding the first partial model (the cylindrical model 72a) of a set of partial models defined for the player object 71. Similarly, the second partial model data 90b is data regarding the second partial model (the cylindrical model 72b) of the set of partial models defined for the player object 71. The third partial model data 90c is data regarding the third partial model (the cylindrical model 72c) of the set of partial models defined for the player object 71.

Although not shown in FIG. 9, the first partial model data 90a includes various data as does the whole model data 85. Specifically, the first partial model data 90a includes reference position data, location position data, radius data, and height data for the cylindrical model 72a. The second and third partial model data 90b and 90c each include reference position data, location position data, radius data, and height data, as does the first partial model data 90a.

The colliding object data 91 represents an object determined to be in contact with the player object 71. Thus, while the object is in contact with the player object 71, data representing the object is stored in the work memory 32 as the colliding object data 91.

The first object data 92a is data regarding a predetermined first object to be present in the game space. The first object data 92a includes object position data, orientation data, and whole model data, as does the player object data 82. The object position data included in the first object data 92a represents the position of the first object in the game space. The orientation data included in the first object data 92a represents the orientation of the first object. The whole model data included in the first object data 92a is data regarding a whole model defined for the first object. The first object may further include the partial model data, or may include only the whole model data. Specifically, partial models do not need to be defined for all objects to be present in the game space, and for some objects, a single whole model may be defined, irrespective of the direction (orientation) of the object. Other object data such as the second object data 92b are similar, in data structure, to the first object data.

The model determining table data 93 represents a model determining table used for determining the number of cylindrical models to be defined for an object and the positions thereof. FIG. 10 shows an example of the model determining table. The model determining table shown in FIG. 10 is a table used when defining a cylindrical model or cylindrical models for the player object 71. The model determining table specifies, for each range of angle θ of the player object 71 with respect to the reference direction, the number of cylindrical models to be defined for the player object 71, the reference point position ("reference position") of each cylindrical model, and the position ("location position") at which the cylindrical model is located with respect to the reference point. Specifically, if the player object 71 is standing upright on the ground 74 (where θ=0°), one cylindrical model (whole model) is defined for the player object 71, the reference point position is determined to be the position P1, and the cylindrical model is located so that the center of the bottom surface thereof is at the reference point position. If the angle θ is in the range of 0°≦θ≦45°, three cylindrical models (partial models) are defined for the player object 71. The reference point positions are determined to be the positions P2 to P4. More specifically, the reference point position for the first partial model (denoted as "1st" in FIG. 10) is determined to be the position P2, that for the second partial model (denoted as "2nd" in FIG. 10) is determined to be the position P3, and that for the third partial model (denoted as "3rd" in FIG. 10) is determined to be the position P4. Each cylindrical model is located so that the center of the bottom surface thereof is at the reference point position. If the angle θ is in the range of 45°<θ<135°, three cylindrical models (partial models) are defined for the player object 71, the reference point positions thereof are determined to be the positions P5 to P7, and each cylindrical model is located so that the center thereof is at the reference point position. If the angle θ is in the range of 135°≦θ<180°, three cylindrical models (partial models) are defined for the player object 71, the reference point positions thereof are determined to be the positions P8 to P10, and each cylindrical model is located so that the center of the top surface thereof is at the reference point position. If the angle θ is in the range of θ=180° (where the player object 71 is standing upside-down on the ceiling), a single cylindrical model (whole model) is defined for the player object 71, the reference point position is determined to be the position P11, and the cylindrical model is located so that the center of the top surface thereof is at the reference point position.

While a whole model is defined for the player object 71 only when the angle θ is 0° or 180° in the example of FIG. 10, a whole model may be defined for the player object 71 when 0°≦θ<θ' (θ' is a predetermined constant). In other words, the video game device 3 may define a whole model even if the player object 71 is slightly inclined with respect to the reference direction. While only one model determining table is stored in the present embodiment, the video game device 3 may use different model determining tables for different types or statuses of objects.

Figure 11:
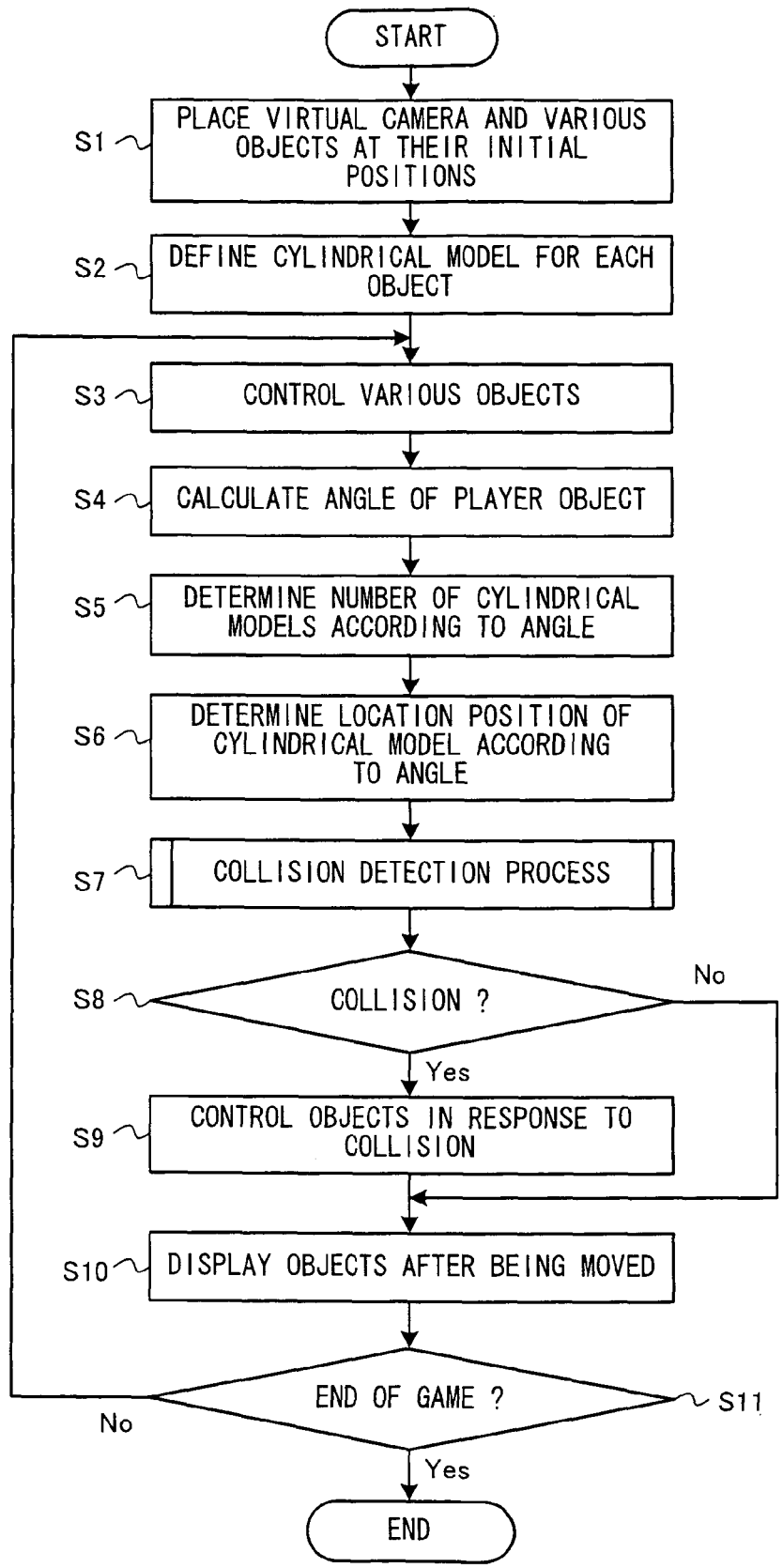
FIG. 11 is a main flow chart showing the flow of a game process performed by the video game device.
Figure 12:
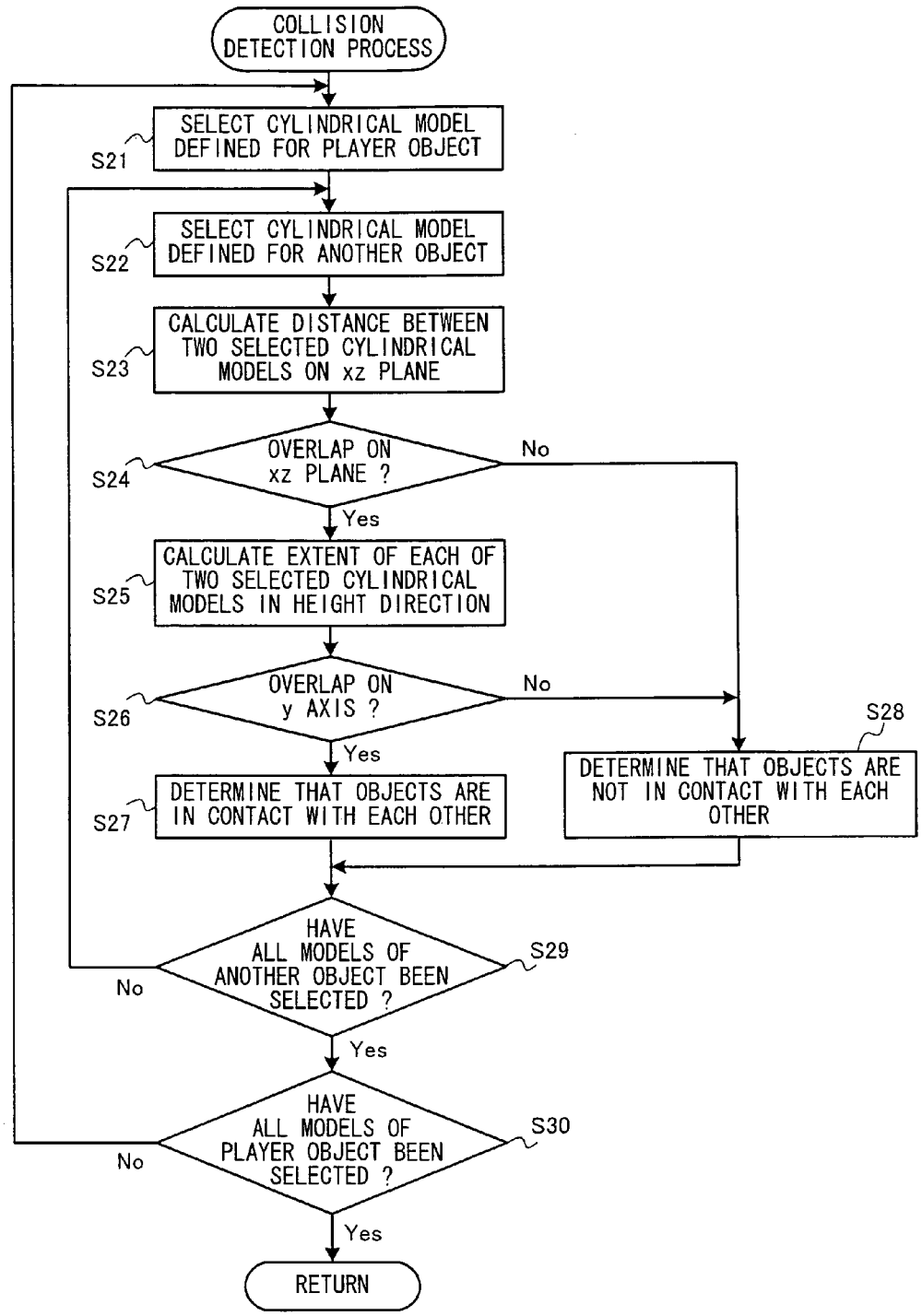
FIG. 12 is a flow chart showing the detailed flow of step S7 shown in FIG. 11.

Referring now to FIGS. 11 and 12, the details of the game process performed by the video game device 3 when executing the video game program 80 will be described. FIG. 11 is a main flow chart showing the flow of a game process performed by the video game device 3. When the power of the video game device 3 is turned ON, the CPU 31 of the video game device 3 executes a boot program stored in a boot ROM (not shown), thus initializing various units such as the work memory 32. The video game program 80 stored in the cartridge 5 is loaded to the work memory 32, and the CPU 31 starts executing the video game program 80. The flow chart of FIG. 8 shows the game process performed after the completion of the process described above. FIGS. 11 and 12 show, in detail, portions of the game process relevant to the process of determining whether or not the player object and another object have contacted each other during the game, while other portions that are not directly relevant to the present invention will not be described in detail. It is assumed in the game process shown in FIGS. 11 and 12 that partial models are not defined for objects other than the player object.

In step S1, the virtual three-dimensional game space is created, while determining the initial position and direction (viewing direction) of the virtual camera for displaying a portion of the game space. Various objects are arranged in the created game space each at the initial position and in the initial orientation. Specifically, the CPU 31 stores data representing the initial position of each object as object position data included in the object data of the object in the work memory 32.

Then, in step S2, a cylindrical model is defined for each object. It is assumed that in step S2, a whole model is defined for each object. Specifically, the CPU 31 sets values for various data included in the whole model data (the reference position data, the location position data, the radius data, and the height data). The values of the various data set in step S2 are predetermined values specified in the video game program 80.

After step S2, in the process starting from step S3, the game is played based on the player's game operations using the controller 6. The loop through steps S3 to S11 is iterated once per frame.

In step S3, various objects are controlled. For example, the player object is controlled based on the player's operation on the controller 6. Each enemy object is controlled by the CPU 31 according to a predetermined algorithm included in the video game program 80. For example, when an enemy object throws a stone object, the stone object is controlled by the CPU 31 based on the initial velocity of the thrown stone object, the virtual gravity, etc. If the position or orientation of an object in the game space changes as a result of step S3, the CPU 31 updates the object position data included in the object data of the object (e.g., the first object data 92a) to represent the new position and the object orientation data included in the object data to represent the new orientation. For example, if the position and the orientation of the player object change, the object position data 83 and the orientation data 84a of the player object data 82 are updated.

In step S4, the CPU 31 calculates the angle of the player object with respect to the reference direction. Specifically, the CPU 31 calculates the angle between the ground and the reference direction at the position of the player object 71. The position of the player object 71 is the ground position at the feet of the player object 71, and is represented by the object position data 83. Therefore, the CPU 31 calculates the direction of the ground at the position represented by the object position data 83 with reference to the game space terrain data, and calculates the angle between the calculated direction and the reference direction. In other embodiments, in step S4, the CPU 31 may refer to the orientation data 84 stored in the work memory 32 to calculate the angle between the direction represented by the orientation data and the predetermined reference direction.

In step S5, the CPU 31 determines the number of cylindrical models to be defined for the player object based on the angle calculated in step S4. In the present embodiment, the CPU 31 determines the number of cylindrical models by using the model determining table stored in the work memory 32. Specifically, the CPU 31 identifies the number of cylindrical models associated with the angle in the model determining table. For example, when the player object is standing in the horizontal direction on the wall 77 being vertical to the ground (see FIG. 5), the angle θ=90°, according to which the number of cylindrical models is determined to be three.

In step S6, the CPU 31 determines the position at which the cylindrical model is defined with respect to the player object. In the present embodiment, the CPU 31 determines the position at which the cylindrical model is defined by using the model determining table. Specifically, the CPU 31 identifies the reference position and the location position associated with the angle in the model determining table. Then, data representing the identified reference position is stored in the work memory 32 as the reference position data 86, and data representing the identified location position is stored in the work memory 32 as the location position data 87. Then, the CPU 31 determines the position of the cylindrical model according to the values of the reference position data 86 and the location position data 87 stored in the work memory 32. For example, when the player object is standing in the horizontal direction on the wall 77 being vertical to the ground (see FIG. 5), the angle θ=90°, according to which the reference point positions for three cylindrical models are determined to be the positions P5 to P7, and the three cylindrical models are each located so that the center thereof is at the reference point position.

Then, in step S7, the collision detection process is performed. The collision detection process is a process for determining whether or not two objects (e.g., the player object and another object) are being in contact with each other. The details of the collision detection process will now be described with reference to FIG. 12.

FIG. 12 is a flow chart showing the detailed flow of step S7y shown in FIG. 11. While FIG. 12 shows a process for detecting a collision between the player object and another object, the collision detection between other types of objects can similarly be performed as shown in FIG. 12. First, in step S21 of the collision detection process, the CPU 31 selects one of the cylindrical models defined for the player object. Step S21 is performed repeatedly as the loop through steps S21 to S30 is repeated. In step S21, the CPU 31 selects one of the cylindrical models that has not been selected.

In step S22, the CPU 31 selects one of the cylindrical models defined for the other object. Step S22 is performed repeatedly as the loop through steps S21 to S30 is repeated. In step S22, the CPU 31 selects one of the cylindrical models that has not been selected.

In step S23, the CPU 31 calculates the distance, on the xz plane, between two cylindrical models selected in steps S21 and S22. The distance calculated in this step is the distance between the centers of the two cylindrical models. Specifically, where the position of one cylindrical model is (x1,y1,z1) and that of the other cylindrical model is (x2,y2,z2), the distance d can be calculated by the following expression.

$$d=((x1-x2)^2+(z1-z2)^2)^{1/2}$$

The position of the cylindrical model herein refers to the reference point position for the cylindrical model. Where the reference point position is represented by using the coordinate system with respect to the player object 71, the CPU 31 performs the above calculation after converting the coordinate values representing the reference point position to those in the world coordinate system.

In step S24, it is determined whether or not the two cylindrical models selected in steps S21 and S22 have an overlap therebetween on the xz plane. The detection-process can be performed based on the distance d calculated in step S23, the radius r1 of the cylindrical model selected in step S21, and the radius r2 of the cylindrical model selected in step S22. The radii r1 and r2 are stored in the work memory 32 as radius data included in whole model data or partial model data. Specifically, the CPU 31 determines whether or not two cylindrical models have an overlap therebetween on the xz plane based on the following expression.

$$r1+r2 \geq d$$

Specifically, if r1+r2≧d, it is determined that the two cylindrical models have an overlap therebetween on the xz plane. If r1+r2<d, it is determined that the two cylindrical models have no overlap therebetween on the xz plane. If it is determined in step S24 that the two cylindrical models have an overlap therebetween on the xz plane, the process proceeds to step S25. If it is determined that the two cylindrical models have no overlap therebetween on the xz plane, the process proceeds to step S28.

In step S25, the CPU 31 calculates the extent of each of the two cylindrical models selected in steps S21 and S22 in the height direction. The extent is represented as a range of the y coordinate value in the world coordinate system, and can be calculated based on the height of the cylindrical model and the reference point position (reference position) for the cylindrical model, and the location position of the cylindrical model with respect to the reference position. For example, assume that the coordinate values of the reference position represented by using the world coordinate system are (x3,y3,z3), and the height of the cylindrical model is h. Then, the extent can be expressed as y3≦y≦y3+h if the location position is "bottom surface". The extent is y3−h/2≦y≦y3+2/h if the location position is "center". The extent is y3≦y≦y3+h if the location position is "top surface". The possible range of the y coordinate value is calculated, as described above, for each of the two cylindrical models selected in steps S21 and S22. Step S25 is followed by step S26.

In step S26, it is determined whether or not the two cylindrical models selected in steps S21 and S22 have an overlap therebetween in the y-axis direction. The detection process can be performed based on the extent value calculated in step S25. Specifically, the CPU 31 determines whether or not the two cylindrical models have an overlap therebetween in the y-axis direction based on whether or not the two extents calculated in step S25 overlap with each other. For example, where the two extents are "1≦y≦5" and "4≦y≦6", overlapping with each other, it is determined that the two cylindrical models have an overlap therebetween in the y-axis direction. Where the two extents are "1≦y≦5" and "7≦y≦9", not overlapping with each other, it is determined that the two cylindrical models have no overlap therebetween in the y-axis direction. If it is determined in step S26 that the two cylindrical models have an overlap therebetween in the y-axis direction, the process proceeds to step S27. If it is determined in step S26 that the two cylindrical models have no overlap therebetween in the y-axis direction, the process proceeds to step S28.

In step S27, it is determined that the two objects associated with the two cylindrical models selected in steps S21 and S22 are in contact with, each other. Specifically, the CPU 31 updates the colliding object data 91 included in the player object data 82 stored in the work memory 32. More specifically, data representing the object for which the cylindrical model selected in step S22 is defined is added as the colliding object data 91. Step S27 is followed by step S29.

In step S28, it is determined that two objects associated with the two cylindrical models selected in steps S21 and S22 are not in contact with each other. Specifically, if data representing the object for which the cylindrical model selected in step S22 is included in the colliding object data 91, the CPU 31 deletes the data representing the object. Step S28 is followed by step S29.

In step S29, it is determined that all the cylindrical models defined for objects other than the player object have been selected in step S22. If there is any unselected cylindrical model, step S22 is performed again. Step S29 is performed so that it is possible to determine whether or not the collision detection has been performed for the cylindrical model selected in step S21 and the other cylindrical models. The loop through steps S22 to S29 is repeated until the determination result in step S29 is true. If all the cylindrical models have already been selected, the process proceeds to step S30.

In step S30, it is determined whether or not all the cylindrical models defined for the player object have been selected in step S21. If there is any unselected cylindrical model, step S21 is performed again. Step S30 is performed so that it is possible to determine whether or not the collision detection has been performed for all the cylindrical models defined for the player object. The loop through steps S21 to S30 is repeated until the determination result in step S30 is true. If all the cylindrical models have already been selected, the CPU 31 exits the collision detection process.

Referring back to FIG. 9, in step S8, following the collision detection process in step S7, it is determined whether or not there is any other object being in contact with the player object. The determination can be made based on the colliding object data 91 of the player object data 82 stored in the work memory 32. Specifically, the CPU 31 determines whether or not data representing any other object is included in the colliding object data 91. If data representing any other object is included in the colliding object data 91, it is determined that there is another object being in contact with the player object. If data representing any, other object is not included in the colliding object data 91, it is determined that there is no other object being in contact with the player object. If it is determined in step S8 that there is any other object being in contact with the player object, the process proceeds to step S9. If it is determined that there is no other object being in contact with the player object, the process proceeds to step S10 while skipping step S9.

In step S9, objects are controlled in response to the collision between the player object and the other, colliding object. For example, if the player object is being in contact with a stone object, the CPU 31 may show the player object bending backward as a result of hitting the stone (irrespective of the player's operation), or change the direction of the stone object so as to show the stone object being bounced back off the player object. Step S9 is followed by step S10.

In step S10, the movements of the objects in the game space are displayed on the TV 2. The CPU 31 produces a game image showing various objects, as viewed from a virtual camera, each at its new position and in its new orientation as determined in steps S3, S4 and S9, and displays the produced game image on the TV 2. Then, in step S11, it is determined whether or not to end the game. The determination of step S11 is based on, for example, whether or not the player character's remaining physical strength has become 0 or whether or not the player character has defeated all the enemy characters. If it is determined in step S11 that the game is to be ended, the CPU 31 exits the game process shown in FIG. 11. If it is determined that the game is not to be ended, the process proceeds to step S3. Thereafter, steps S3 to S11 are repeated until it is determined in step S11 that the game is to be ended. The details of the game process are as described above.

As described above, according to the present embodiment, the CPU 31 calculates the angle of the player object with respect to a predetermined reference direction (step S4), and a plurality of cylindrical models are defined for the player object if the angle is greater than a predetermined value (step S5). Thus, by using a cylindrical model, it is possible to easily perform the collision detection. By using a plurality of cylindrical models, it is possible to accurately perform the collision detection even if the player object is inclined with respect to the reference direction.

In the above embodiment, in order to properly approximate the shape of the player object by the cylindrical model, the position of the cylindrical model with respect to the player object is changed according to the angle θ of the player object (step S6). Specifically, the video game device 3 changes the reference position and the location position according to the angle θ. Changing one of the reference position and the location position is sufficient for changing the position of a cylindrical model with respect to the object. Therefore, in other embodiments, only one of the reference position and the location position may be changed in order to change the position of the cylindrical model with respect to the object according to the angle θ of the player object.

In the description above, a whole model or a set of partial models is selectively used for the player object. However, the present invention is applicable to any type of an object to be present in the virtual three-dimensional space. The collision detection process in step S7 can be used similarly with any object other than the player object.

Figure 13A:
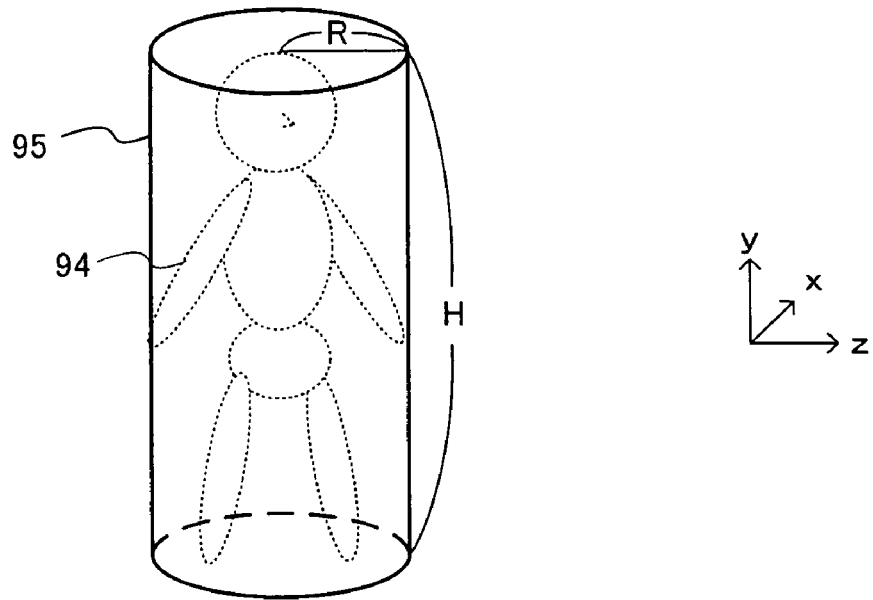
FIGS. 13A and 13B show a whole model defined for an object and a set of partial models defined therefor, respectively.
Figure 13B:
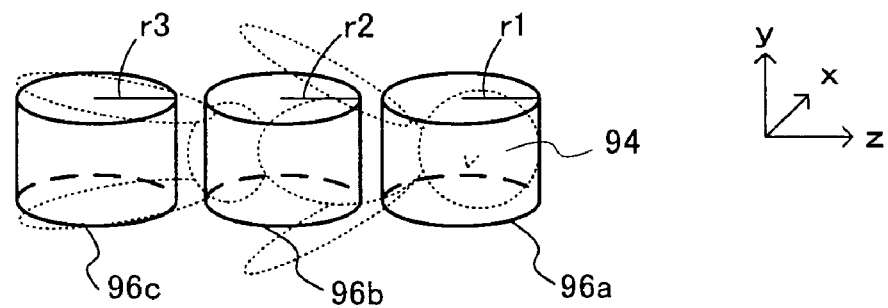

FIGS. 13A and 13B show a whole model defined for an object 94 and a set of partial models defined therefor, respectively. In FIGS. 13A and 13B, the object 94 is denoted by a dotted line so that the cylindrical models stand out. In FIGS. 13A and 13B, the height of a whole model 95 is H, and the radius of the bottom surface thereof is R. It is assumed that the number of partial models defined for the object 94 is three (cylindrical models 95a to 95c), and the radii of the bottom surfaces of the three cylindrical models 95a to 95c are r1, r2 and r3, respectively. It is preferred that the following relationship holds for the height H of the whole model and the radii r1 to r3 of the bottom surfaces of the cylindrical models 95a to 95c.

$$H \leq 2 \times (r1 + r2 + r3)$$

If the above expression is not satisfied, there will be gaps between the cylindrical models 95a to 95c (see FIG. 13B), thus failing to accurately perform the collision detection. Thus, in order to accurately perform the collision detection, the sizes of the whole model and the partial models need to be determined so as to at least satisfy the above expression. Moreover, it is preferred that each of the cylindrical models 95a to 95c defined for the object 94 is located so as to be in contact with at least another one of the cylindrical models 95a to 95c. Therefore, the cylindrical models 95a to 95c are combined into a single integral model with no gap between the cylindrical models 95a to 95c, and the object 94 can be included within the cylindrical models 95a to 95c. Thus, it is possible to accurately perform the collision detection. In the example shown in FIGS. 13A and 13B, the number of partial models is three. Where the number of partial models is n (n is an integer greater than or equal to 2), the size of the whole model and that of the partial models can be determined so that the sum of the bottom-surface diameters of all the partial models is greater than or equal to the height of the whole model.

While a single whole model is defined for the player object 71 standing upright on the ground 74 in the above embodiment, a plurality of partial models may be defined even for the player object 71 standing upright on the ground 74 in other embodiments. Then, the number of partial models can be set to a predetermined number, and step S5 in FIG. 11 can be omitted.

Referring now to FIGS. 14 and 15, a variation of the above embodiment will be described. In the present variation, the video game device 3 changes the size of the cylindrical model according to the angle of the player object 71 with respect to the reference direction. The details of the variation will now be described.

FIG. 14 shows an example of a model determining table used in the present variation. In addition to the contents of the model determining table shown in FIG. 10, the model determining table shown in FIG. 14 specifies, for each range of angle θ of the player object 71 with respect to the reference direction, the size of the cylindrical model (the bottom-surface radius and the height). Based on this table, the video game device 3 determines the size of the cylindrical model for a given angle.

FIG. 15 is a flow chart showing the flow of the game process according to the variation. In FIG. 15, like steps to those of FIG. 11 are denoted by like step numbers and will not be further described below. The present variation differs from the above embodiment only in that step S31 is performed after step S6.

In step S31, the size of the cylindrical model to be defined for the player object is determined based on the angle calculated in step S4. Step S31 is performed by referencing the model determining table stored in the work memory 32. Specifically, the CPU 31 determines the size of each cylindrical model to be the size that is associated with the calculated angle in the model determining table. With the model determining table shown in FIG. 14, if the angle θ is in the range of 45°<θ<135°, the bottom-surface radius of the first partial model is determined to be r2 and the height thereof is determined to be h2. The bottom-surface radius of the second partial model is determined to be r3, and the height thereof is determined to be h3. The bottom-surface radius of the third partial model is determined to be r4, and the height thereof is determined to be h4. Then, the CPU 31 updates the radius data and the height data included in each of the partial model data 90a to 90c of the player object data 82 to represent the new values. Step S31 is followed by step S7. Step S7 and subsequent steps are as described in the above embodiment.

As described above, according to the present variation, the size of the cylindrical model can be changed according to the angle of the player object with respect to the reference direction, whereby the size of the cylindrical model can be determined more precisely according to the inclination of the player object. While the present variation is directed to a case where the size of the cylindrical model defined for the player object is changed, the present variation is applicable to objects other than the player object.

While the above embodiment is directed to a case where the present invention is realized as a video game device and a video game program, the present invention is not limited thereto. The present invention is applicable to any image processing device or any image processing program for performing a collision detection between objects in a virtual three-dimensional space.

The present invention can be used in a video game device or a video game program, aiming at, for example, further reducing the processing load for the collision detection between objects.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium storing an image processing program to be executed by a computer of an image processing device for displaying, on a display device, a virtual three-dimensional space where there are a plurality of objects each having a collision detection region defined therefor, wherein the image processing program instructs the computer to perform:
   calculating an inclination of an object with respect to a predetermined reference direction in the three-dimensional space;
   determining the number of collision detection regions to be defined for the object according to the inclination of the object; and
   defining the determined number of collision detection regions for the object in an arrangement being determined according to the inclination of the object so that a bottom surface of each of the collision detection regions is perpendicular to the reference direction.

2. The storage medium according to claim 1, wherein the calculated inclination is represented by an angle between the reference direction and a direction of a ground at a position where the object is located.

3. The storage medium according to claim 1, wherein the calculated inclination is represented by an angle between a predetermined central axis of the object and the reference direction.

4. The storage medium according to claim 1, wherein in said determining the number-of-regions, the computer determines the number of regions to be defined for the object to be one if the inclination of the object with respect to the reference direction is less than a predetermined angle.

5. The storage medium according to claim 1, wherein in said determining the number-of-regions, the computer determines the number of regions to be defined for the object to be more than one if the inclination of the object with respect to the reference direction is greater than a predetermined angle.

6. The storage medium according to claim 4, wherein in said determining the number-of-regions, the computer determines the number of regions to be defined for the object to be more than one if the inclination of the object with respect to the reference direction is greater than the predetermined angle.

7. The storage medium according to claim 4, wherein a sum of bottom-surface diameters of the number of collision detection regions defined for the object is greater than or equal to a height of a single collision detection region to be defined for the object when the inclination of the object with respect to the reference direction is less than the predetermined angle.

8. The storage medium according to claim 6, wherein a sum of bottom-surface diameters of a plurality of collision detection regions defined for the object when the inclination of the object with respect to the reference direction is greater than the predetermined angle is greater than or equal to a height of a single collision detection region to be defined for the object when the inclination of the object with respect to the reference direction is less than the predetermined angle.

9. The storage medium according to claim 1, wherein if the number of regions is determined to be two or more in said determining the number-of-regions, the computer arranges, in said defining the determined number of collision detection regions, the collision detection regions defined for the object so that each collision detection region is in contact with at least one of the other collision detection regions and so that the collision detection regions are combined into a single integral region.

10. The storage medium according to claim 1, wherein said defining the determined number of collision detection regions includes changing a size of the collision detection region defined for the object according to the angle of the object if the inclination of the object with respect to the reference direction is greater than a predetermined angle.

11. An image processing device for displaying, on a display device, a virtual three-dimensional space where there is at least one object each having a collision detection region defined therefor, the image processing device comprising:
   an inclination angle calculator for calculating an inclination of an object with respect to a predetermined reference direction in the three-dimensional space;
   number-of-regions determining programmed logic circuitry for determining the number of collision detection regions to be defined for the object according to the inclination of the object; and
   collision detection region defining programmed logic circuitry for defining the determined number of collision detection regions for the object in an arrangement determined according to the inclination of the object so that a bottom surface of each of the collision detection regions is perpendicular to the reference direction.

12. The device according to claim 11, wherein the inclination calculated by the inclination calculator is represented by an angle between the reference direction and a direction of a ground at a position where the object is located.

13. The device according to claim 11, wherein the inclination calculated by the inclination calculator is represented by an angle between a predetermined central axis of the object and the reference direction.

14. The device according to claim 11, wherein by the number-of-regions determining programmed logic circuitry, the image processing device determines the number of regions to be defined for the object to be one if the inclination of the object with respect to the reference direction is less than a predetermined angle.

15. The device according to claim 11, wherein by the number-of-regions determining programmed logic circuitry, the image processing device determines the number of regions to be defined for the object to be more than one if the inclination of the object with respect to the reference direction is greater than a predetermined angle.

16. The device according to claim 14, wherein by the number-of-regions determining programmed logic circuitry, the image processing device determines the number of regions to be defined for the object to be more than one if the inclination of the object with respect to the reference direction is greater than the predetermined angle.

17. The device according to claim 14, wherein a sum of bottom-surface diameters of the number of collision detection regions defined for the object is greater than or equal to a height of a single collision detection region to be defined for the object when the inclination of the object with respect to the reference direction is less than the predetermined angle.

18. The device according to claim 16, wherein a sum of bottom-surface diameters of a plurality of collision detection regions defined for the object when the inclination of the object with respect to the reference direction is greater than the predetermined angle is greater than or equal to a height of a single collision detection region to be defined for the object when the inclination of the object with respect to the reference direction is less than the predetermined angle.

19. The device according to claim 11, wherein if the number of regions is determined to be two or more by the number-of-regions determining programmed logic circuitry, the image processing device arranges, by the collision detection region defining programmed logic circuitry, the collision detection regions defined for the object so that each collision detection region is in contact with at least one of the other collision detection regions and so that the collision detection regions are combined into a single integral region.

20. The device according to claim 11, wherein the collision detection region defining programmed logic circuitry includes a size changing programmed logic circuitry of changing a size of the collision detection region defined for the object according to the angle of the object if the inclination of the object with respect to the reference direction is greater than a predetermined angle.

21. A method executed by a computer of an image processing device for displaying, on a display device, a virtual three-dimensional space where there are a plurality of objects each having a collision detection region defined therefor, the method comprising:
   calculating, using the computer, an inclination of an object with respect to a predetermined reference direction in the three-dimensional space;
   determining the number of collision detection regions to be defined for the object according to the inclination of the object; and
   defining the determined number of collision detection regions for the object in an arrangement being determined according to the inclination of the object so that a bottom surface of each of the collision detection regions is perpendicular to the reference direction.

22. A system comprising:
   a non-transitory computer-readable storage medium configured to store an image processing program to be executed for displaying, on a display device, a virtual three-dimensional space where there are a plurality of objects each having a collision detection region defined therefor; and
   a computer system, having one or more processors, the computer system being configured to execute the program to:
   calculate an inclination of an object with respect to a predetermined reference direction in the three-dimensional space;
   determine the number of collision detection regions to be defined for the object according to the inclination of the object; and
   define the determined number of collision detection regions for the object in an arrangement being determined according to the inclination of the object so that a bottom surface of each of the collision detection regions is perpendicular to the reference direction.

* * * * *